(12) United States Patent
Kanenari

(10) Patent No.: US 9,645,031 B2
(45) Date of Patent: May 9, 2017

(54) TRANSMITTING DEVICE AND TIRE STATE MONITORING SYSTEM

(71) Applicant: The Yokohama Rubber Co., LTD., Minato-ku, Tokyo (JP)

(72) Inventor: Daisuke Kanenari, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 127 days.

(21) Appl. No.: 14/433,368

(22) PCT Filed: Oct. 3, 2013

(86) PCT No.: PCT/JP2013/076949
§ 371 (c)(1),
(2) Date: Apr. 2, 2015

(87) PCT Pub. No.: WO2014/054736
PCT Pub. Date: Apr. 10, 2014

(65) Prior Publication Data
US 2015/0247775 A1    Sep. 3, 2015

(30) Foreign Application Priority Data

Oct. 3, 2012 (JP) ................................ 2012-220923

(51) Int. Cl.
*G01L 17/00* (2006.01)
*B60C 23/04* (2006.01)

(52) U.S. Cl.
CPC .......... *G01L 17/00* (2013.01); *B60C 23/0493* (2013.01); *B60C 23/0494* (2013.01)

(58) Field of Classification Search
CPC ........................ B60C 23/0493; B60C 23/0494
See application file for complete search history.

(56) References Cited

U.S. PATENT DOCUMENTS

2010/0018302 A1* 1/2010 Murray, Jr. ......... B60C 23/0408
73/146.5
2010/0236325 A1 9/2010 Tanuma
(Continued)

FOREIGN PATENT DOCUMENTS

JP            4623228       2/2011
JP         2011-105083      6/2011
(Continued)

OTHER PUBLICATIONS

International Search Report for International Application No. PCT/JP2013/076949 dated Jan. 7, 2014, 4 pages, Japan.

*Primary Examiner* — Paul West
(74) *Attorney, Agent, or Firm* — Thorpe North & Western

(57) ABSTRACT

A transmitting device which is disposed in a tire hollow region, and which transmits tire information relating to the state of the tire, comprises: a sensor which detects, as tire information, a state of a gas which is filled in the hollow region of a tire which is surrounded by the tire and a rim; a transmitter which wirelessly transmits the tire information; and a casing which houses the sensor and the transmitter therewithin. The casing further comprises a through hole which passes through a wall of the casing, and which extends in an orthogonal direction to a sensor detection face of the sensor. The surface area of an outer side aperture part of the through hole is 0.8 mm² or less, and the sensor detection face faces an inner side aperture part of the casing inner side of the through hole without obstructing with the space.

20 Claims, 8 Drawing Sheets

(56) References Cited

U.S. PATENT DOCUMENTS

2012/0222478 A1 9/2012 Kanenari et al.
2012/0235808 A1 9/2012 Kanenari et al.

FOREIGN PATENT DOCUMENTS

| JP | 2012-011904 | 1/2012 |
| JP | 2012-025191 | 2/2012 |
| JP | 2012-148650 | 8/2012 |
| JP | 2012-148690 | 8/2012 |
| WO | WO 2007/142103 | 12/2007 |
| WO | WO 2011/058743 | 5/2011 |
| WO | WO 2012/001897 | 1/2012 |
| WO | WO 2012/098858 | 7/2012 |

* cited by examiner

TRANSMITTING DEVICE AND TIRE STATE MONITORING SYSTEM

TECHNICAL FIELD

The present technology relates to a transmitting device disposed in a tire hollow region and transmitting tire information relating to the state of the tire, and to a tire state monitoring system using the transmitting device.

BACKGROUND

In the related art, it is desirable to carry out inspection and management of the air pressure in a pneumatic tire (simply referred to below as a "tire") assembled on a vehicle in terms of improving the durability of the tire, improving the wear resistance, improving the fuel consumption, or improving the comfort of the ride, in addition to improving the maneuverability. Therefore, various systems for monitoring air pressure of tires have been proposed. Generally, in these systems, air pressure in tires is monitored by detecting the air pressure information of a tire assembled on a wheel, providing a transmitting device for transmitting this information in a tire hollow region of each of the wheels, and acquiring the air pressure information of each tire from the transmitting devices.

For example, a transmitting device and a system are known which are able to appropriately measure and acquire tire information such as the air pressure information of the tire even when repairing a puncture of the tire using a puncture repairing liquid (see Japanese Unexamined Patent Application Publication No. 2011-105083A). Specifically, the transmitting device has a sensor which detects, as tire information, a state of a gas which is filled in a hollow region of a tire which is surrounded by the tire and a rim, a transmitter which wirelessly transmits the detected tire information, and a casing which covers the sensor and the transmitter. The surface of the casing is provided with an aperture part which connects the space inside the casing and the tire hollow region, and the aperture part is provided at the apex of a protruding part which protrudes from the surface of the casing in one direction. The height of the protruding part is 1 mm or greater and the surface area of the aperture part of the through hole is 0.4 mm$^2$ or less.

For example, a puncture repairing liquid which is introduced into the tire hollow region interposed between the tire and the rim is used when the tire is punctured. However, since the aperture part which connects the space inside the casing and the tire hollow region is provided at the apex of a protruding part which protrudes from the surface of the casing in one direction, and the height of the protruding part is 1 mm or greater, even when the puncture repairing liquid is attached to the transmitting device provided in the tire hollow region, it is difficult for the puncture repairing liquid to attach to the apex of the protruding part. Furthermore, since the surface area of the aperture part is also small, it is considered that there are no problems in terms of the ventilation holes being blocked or the measuring of the air pressure being influenced.

SUMMARY

The present technology provides a transmitting device disposed in a tire hollow region and transmitting tire information relating to a state of a tire with a form different from the transmitting device described above, the transmitting device being able to suppress a puncture repairing liquid from blocking a through hole (a ventilation hole) provided in a casing which connects the tire hollow region and the transmitting device even when repairing a puncture of the tire using the puncture repairing liquid, and to provide a tire information monitoring system determining the presence or absence of tire abnormalities using the transmitting device.

One aspect of the present technology is a transmitting device disposed in a tire hollow region, which is configured to transmit tire information relating to the state of the tire. The transmitting device has a sensor configured to detect, as tire information, a state of a gas which is filled in a hollow region of a tire which is surrounded by the tire and a rim, a transmitter configured to wirelessly transmit the detected tire information, and a casing which houses the sensor and the transmitter therewithin.

The casing has a through hole which passes through a wall of the casing and which extends in an orthogonal direction to a sensor detection face of the sensor.

When the aperture part on the tire hollow region side of the through hole is referred to as the outer side aperture part and the aperture part of the through hole on the side of the sensor detection face is referred to as the inner side aperture part, the area of the outer side aperture part is 0.8 mm$^2$ or less and the sensor detection face adjoins the inner side aperture part without interposing a space therebetween.

When the surface area of the side walls of the through hole is set to A mm$^2$, the volume of the through hole which is interposed between the outer side aperture part and the inner side aperture part is set to V mm$^3$, and the distance between the outer side aperture part and the inner side aperture part in a direction orthogonal to the sensor detection face is set to h mm, the distance h mm is 3 to 15 mm, and the ratio A/V of the surface area A mm$^2$ with respect to the volume V mm$^3$ is 3.0 to 30.0 mm$^{-1}$.

When the outer side aperture part of the through hole projects onto a plane including the sensor detection face in a direction orthogonal to the sensor detection face, it is preferable that the outer side aperture part of the through hole be arranged in a manner that a distance between a central position of the sensor detection face and a center projection position of the outer side aperture part is 1 mm or greater.

Furthermore, it is preferable that projection positions of a whole region of the outer side aperture part be positioned away from the sensor detection face.

In addition, it is preferable that an area of the outer side aperture part be smaller than that of the inner side aperture part.

In addition, it is preferable that the through hole have a hole shape in which an expansion ratio, which represents an increase per unit length in a hole depth direction from the outer side aperture part to the inner side aperture part, of an area of a cross-section of the through hole when the through hole is cut at a surface parallel to the sensor detection face of the sensor, has a maximum midway from the outer side aperture part to the inner side aperture part.

Alternatively, it is also preferable that side wall faces surrounding the through hole form a folded shape undulating with ridges and grooves repeated along a circumference of the through hole.

At this time, it is preferable that a depth of the ridges and grooves of the folded shape be increased from the outer side aperture part toward the inner side aperture part.

In addition, it is preferable that the area of the cross-section of the through hole when the through hole is cut at a surface parallel to the sensor detection face of the sensor be continuously increased from the outer side aperture part toward the inner side aperture part.

It is preferable that a circumference length of the inner side aperture part be, for example, 3 to 30 times a circumference length of the outer side aperture part.

Another aspect of the present technology is a tire state monitoring system. The system is provided with a transmitting device, a receiving device, and a monitoring part.

The transmitting device has a sensor configured to detect, as tire information, a state of a gas which is filled in a hollow region of a tire which is surrounded by the tire and a rim, a transmitter configured to wirelessly transmit the detected tire information, and a casing which houses the sensor and the transmitter therewithin.

The receiving device configured to receive the tire information transmitted from the transmitter.

The monitoring part configured to determine the presence or absence of abnormalities in the tire based on the tire information and reports the determination results.

The casing of the transmitting device has a through hole which passes through a wall of the casing and which extends in a direction orthogonal to a sensor detection face of the sensor. When the aperture part on the tire hollow region side of the through hole is referred to as the outer side aperture part and the aperture part of the through hole on the side of the sensor detection face is referred to as the inner side aperture part, the area of the outer side aperture part is 0.8 mm$^2$ or less and the sensor detection face adjoins the inner side aperture part without interposing a space therebetween. Furthermore, when the surface area of the side walls of the through hole is set to A mm$^2$, the volume of the through hole which is interposed between the outer side aperture part and the inner side aperture part is set to V mm$^3$, and the distance between the outer side aperture part and the inner side aperture part in a direction orthogonal to the sensor detection face is set to h mm, the distance h mm is 3 to 15 mm, and the ratio of the surface area A mm$^2$ with respect to the volume V mm$^3$ is 3.0 to 30.0 mm$^{-1}$.

According to the transmitting device and the tire state monitoring system of the present technology, it is difficult for a puncture repairing liquid to block ventilation holes even when repairing a puncture in the tire using the puncture repairing liquid. For this reason, it is still possible to appropriately detect tire information such as the air pressure information of the tire.

DETAILED DESCRIPTION

Description will be given below of the transmitting device and the tire state monitoring system of the present technology based on embodiments illustrated in the attached drawings.

Overview of the Tire Air Pressure Monitoring System

Figure 1:
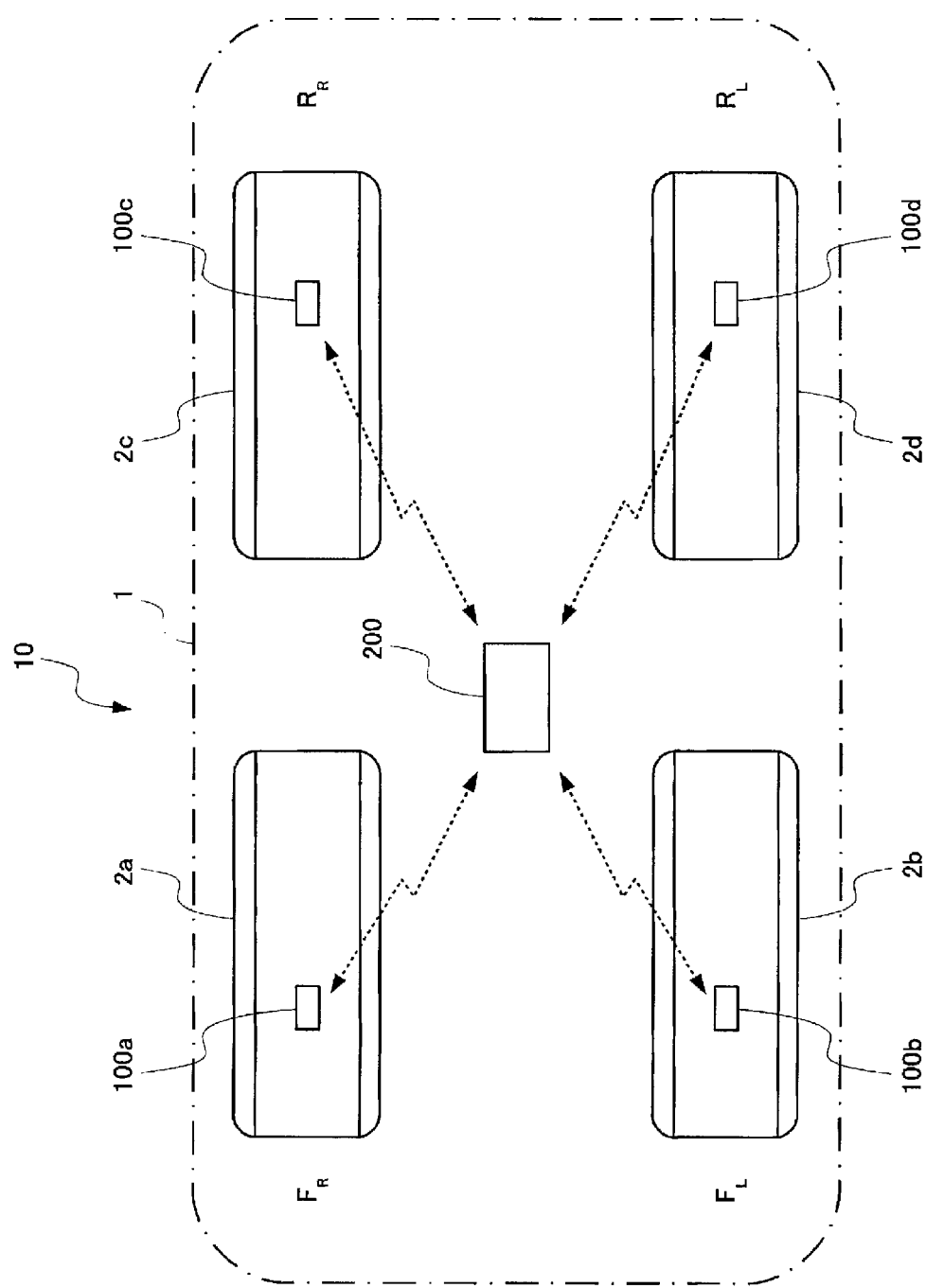
FIG. 1 is a diagram illustrating an overview of a tire air pressure monitoring system which is one embodiment of a tire state monitoring system.

FIG. 1 is an overview of a tire state monitoring system 10 that is an embodiment of a tire state monitoring system.

The tire state monitoring system 10 (hereinafter, referred to as system) is mounted on a vehicle 1. The system 10 has tire information transmitting devices (referred to below as transmitting devices) 100a, 100b, 100c, and 100d disposed in a tire hollow region of each of tires 2a, 2b, 2c, and 2d (when describing the tires 2a, 2b, 2c, and 2d together, tires 2 will be used as a general term for the tires 2a, 2b, 2c, and 2d) of the vehicle 1, and a monitoring device 200.

Each of the transmitting devices 100a, 100b, 100c, and 100d detects, as tire information relating to the state of the tires, a state of a gas which is filled in a hollow region of a tire which is surrounded by the tire 2 and a rim 3 (refer to FIG. 2) and wirelessly transmits the tire information to the monitoring device 200. When describing the transmitting devices 100a, 100b, 100c, and 100d together below, transmitting device 100 will be used as a general term for the transmitting devices 100a, 100b, 100c, and 100d.

Configuration of the Transmitting Device

Figure 2:
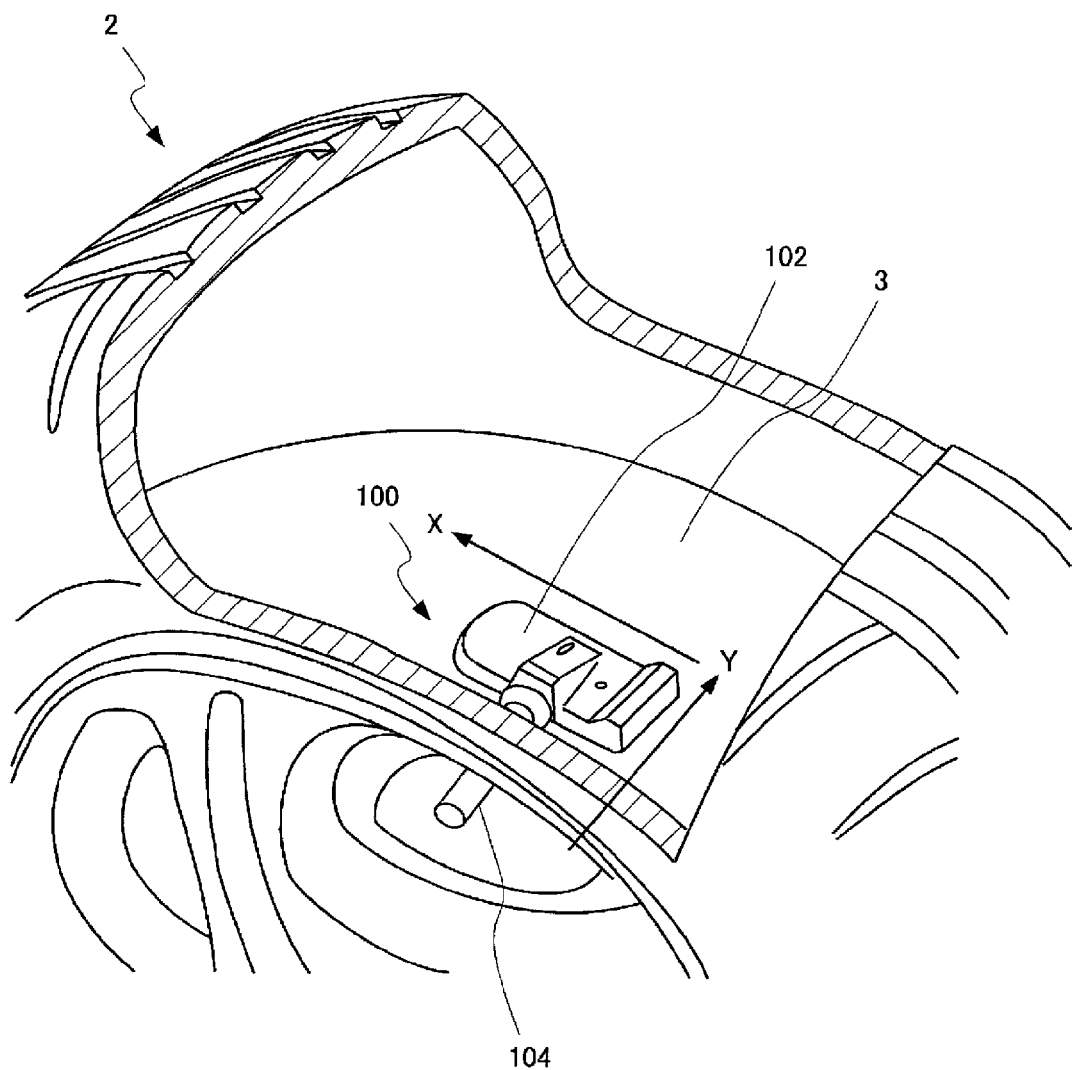
FIG. 2 is a diagram illustrating an example of a method in which a transmitting device illustrated in FIG. 1 is fixed in a tire hollow region.
Figure 3:
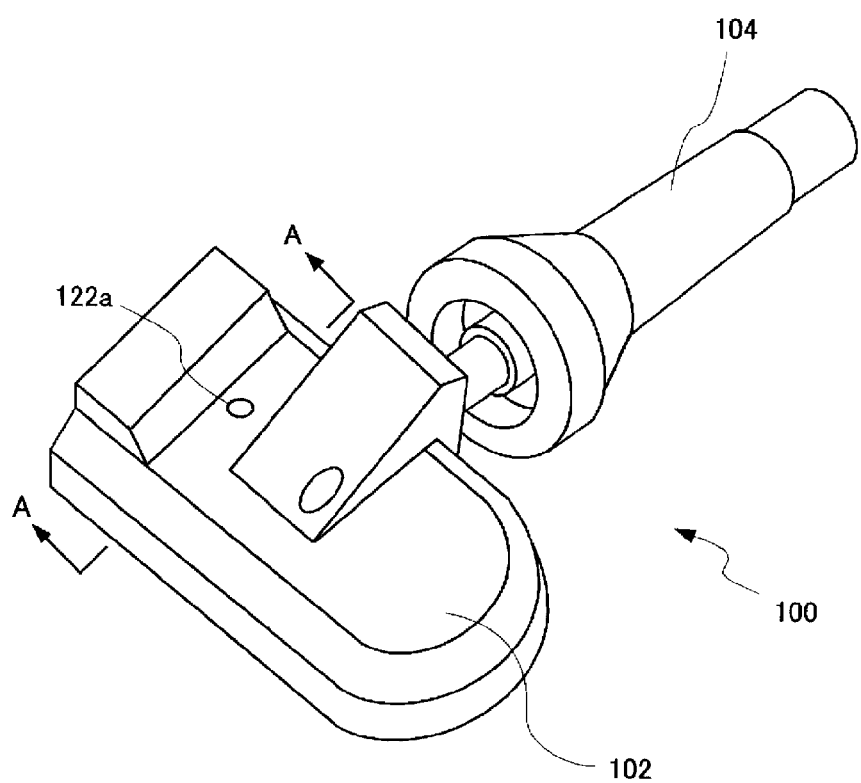
FIG. 3 is a perspective view illustrating the whole of the transmitting device illustrated in FIG. 2.

FIG. 2 is a diagram illustrating an example of a method in which the transmitting device 100 is fixed in the tire. FIG. 3 is a perspective view illustrating the whole of the transmitting device 100 illustrated in FIG. 2.

The transmitting device 100 has a casing 102 arranged inside the tire hollow region. The casing 102 is provided with a tire valve 104 venting air between the tire hollow region and the atmosphere outside of the tire 2. The casing 102 is formed in a substantially plate-like shape and is provided so as to extend in the tire circumferential direction (X-direction in FIG. 2). The tire valve 104 has a tubular shape that extends in the tire width direction (Y-direction in FIG. 2) and is provided so as to pass through, in the tire width direction, a through-hole (not illustrated) provided in the rim 3. That is, one end section of the tire valve 104 in the extension direction (the Y-direction in FIG. 2) is positioned in the tire hollow region. The casing 102 is connected with one end of the tire valve 104 in the extension direction in the tire hollow region, and, as illustrated in FIG. 2, is arranged to be fixed inside the tire hollow region by mechanically fixing the tire valve 104 to the rim 3.

The tire circumferential direction is the rolling direction of a tread portion, in other words, the rolling direction of the tire 2, when the tread portion of the tire 2 is rotated around a rotational axis of the tire. The tire radial direction is the direction extending radially from the tire rotational axis.

Figure 4:
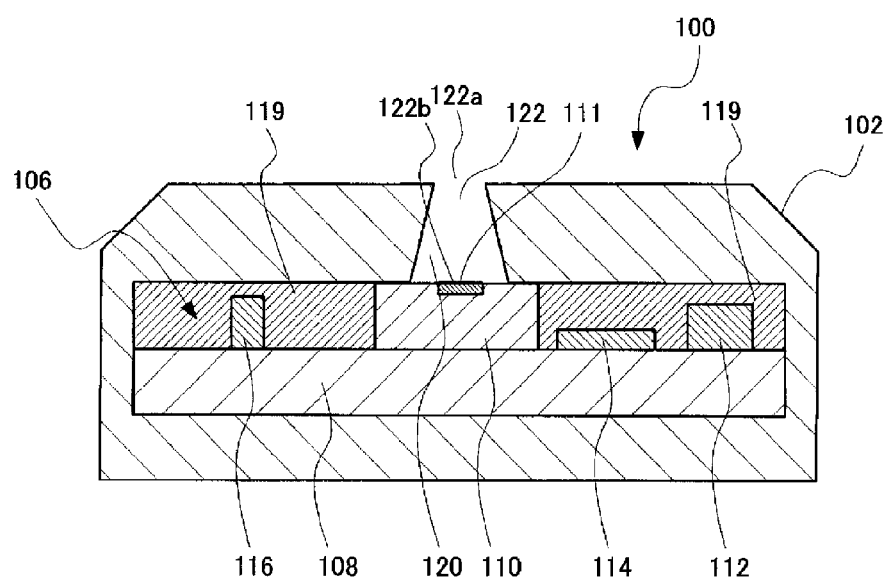
FIG. 4 is a cross-sectional view of the transmitting device along a line A-A illustrated in FIG. 3 in the direction of the arrows.

FIG. 4 is a cross-sectional view of the casing 102 along the line A-A in FIG. 3 in the direction of the arrows. As illustrated in FIG. 4, the casing 102 has a circuit 106 provided inside the casing 102. The circuit 106 has a substrate 108, a sensor unit 110 provided on the substrate 108, a transmitter 112, a processing unit 114, a power supply unit 116, and an antenna 118 (illustrated in FIG. 5). In addition, a portion of the space inside the casing 102 is filled with a sealing resin agent 119 in order to store the circuit 106 in a state of being demarcated from the tire hollow region.

The sensor unit 110 has a sensor which detects, as tire information, a state of a gas which is filled in a hollow region of a tire. In this embodiment, the sensor unit 110 detects, as tire information, the air pressure of the gas filling the tire hollow region. In addition, the sensor unit 110 has a sensor detection face 111 for detecting the air pressure and the sensor detection face 111 adjoins directly the inner side aperture part of the space inside a through hole 122 passing through the casing 102 without interposing a space therebetween. That "the sensor detection face 111 adjoins the inner side aperture part" refers to the sensor detection face 111 becoming a wall face which demarcates, in the inner side aperture part, the space inside the through hole 122.

The casing 102 is provided with the through hole 122 which passes through the wall of the casing 102. The inner section of the through hole 122 is an internal space 120 of the casing 102. An outer side aperture part 122a of the through hole 122 is provided in the surface of the casing 102 where the through hole 122 faces the tire hollow region. That is, the outer side aperture part 122a is provided so as to open toward the outer side in the tire radial direction. On the other hand, an inner side aperture part 122b of the through hole 122 is provided in the inner surface of the casing 102.

As illustrated in FIG. 4, it is preferable that the cross-section of the through hole 122 be wider as the through hole 122 goes from the outer side aperture part 122a toward the inner side aperture part 122b. That is, it is preferable that the opening surface area of the inner side aperture part 122b of the through hole 122 be wider in comparison with the outer side aperture part 122a. By forming the opening surface area of the inner side aperture part 122b to be wider than the opening surface area of the outer side aperture part 122a, it is more difficult for a capillary phenomenon to have an effect compared to a case in which the opening surface areas of the outer side aperture part and the inner side aperture part of the through hole are the same. For this reason, even in a case in which a liquid such as a puncture repairing liquid is attached to the outer side aperture part 122a, it is difficult for the liquid such as the puncture repairing liquid to flow into the through hole 122 and the space inside the through hole 122.

In this manner, the transmitting device 100 has the sensor unit 110 including a sensor (for example, an air pressure sensor to be described below) which detects, as tire information, a state of a gas which is filled in the tire hollow region, the transmitter 112 which wirelessly transmits the detected tire information, and the casing 102 which houses the sensor unit 110 and the transmitter 112 therewithin. The casing 102, the through hole 122, and the sensor unit 110 will be described below.

(Circuit Configuration of Transmitting Device)

Figure 5:
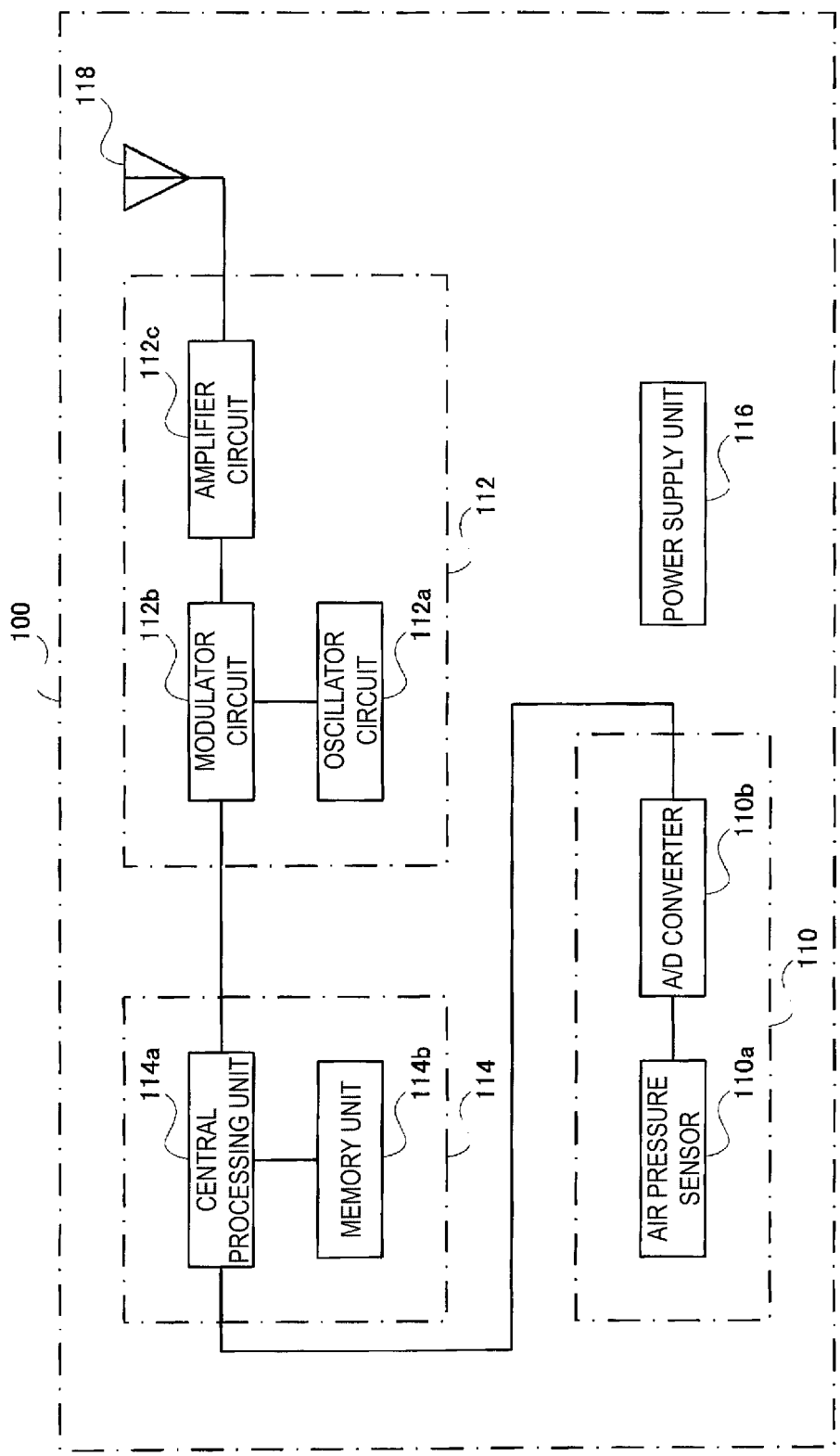
FIG. 5 is a circuit configuration diagram of the transmitting device illustrated in FIG. 1.

FIG. 5 is a circuit configuration diagram of the transmitting device 100.

The sensor unit 110 has an air pressure sensor 110a and an A/D converter 110b. The air pressure sensor 110a senses the air pressure of the space inside the through hole 122 and outputs a pressure signal. Here, since the space in the through hole 122 is connected with the tire hollow region, it is possible for the air pressure sensor 110a to sense the air pressure of the tire hollow region.

The A/D converter 110b performs digital conversion of the pressure signal output from the air pressure sensor 110a and outputs a pressure datum.

The processing unit 114 includes a central processing unit 114a and a memory unit 114b. The central processing unit 114a operates based on a program stored in semiconductor memory of the memory unit 114b. When the central processing unit 114a is powered and operated, the central processing unit 114a controls so as to transmit the pressure data received from the sensor unit 110 as the air pressure information to the monitoring device 200 via the transmitter 112 at a predetermined time interval such as every five minutes. Unique identification information of the transmitting device 100 is stored in advance in the memory unit 114b and the central processing unit 114a controls so as to transmit the pressure datum and the identification information to the monitoring device 200.

The memory unit 114b includes read-only memory (ROM) in which the program that operates the central processing unit 114a is stored and rewritable non-volatile memory such as, for example, electrically erasable programmable read-only memory (EEPROM) or the like. The unique identification information of the transmitting device 100 is stored in a region of the memory unit 114b that is not rewritable.

The transmitter 112 includes an oscillator circuit 112a, a modulator circuit 112b, and an amplifier circuit 112c.

The oscillator circuit 112a generates a carrier wave signal, for example, a radio frequency (RF) signal having a frequency in the 315 MHz band.

The modulator circuit 112b generates a transmission signal by using the pressure datum and the unique identification information of the transmitting device 100 received from the central processing unit 114a to modulate a carrier wave signal. Examples of a modulation method that can be used include amplitude shift keying (ASK), frequency modulation (FM), frequency shift keying (FSK), phase modulation (PM), phase shift keying (PSK), and the like.

The amplifier circuit 112c amplifies the transmission signal generated by the modulator circuit 112b. The amplified transmission signal is transmitted wirelessly through an antenna 118 to the monitoring device 200.

The power supply unit 116 uses a secondary battery, for example, to provide electrical power to the sensor unit 110, the transmitter 112, and the processing unit 114.

(Circuit Configuration of Monitoring Device)

Figure 6:
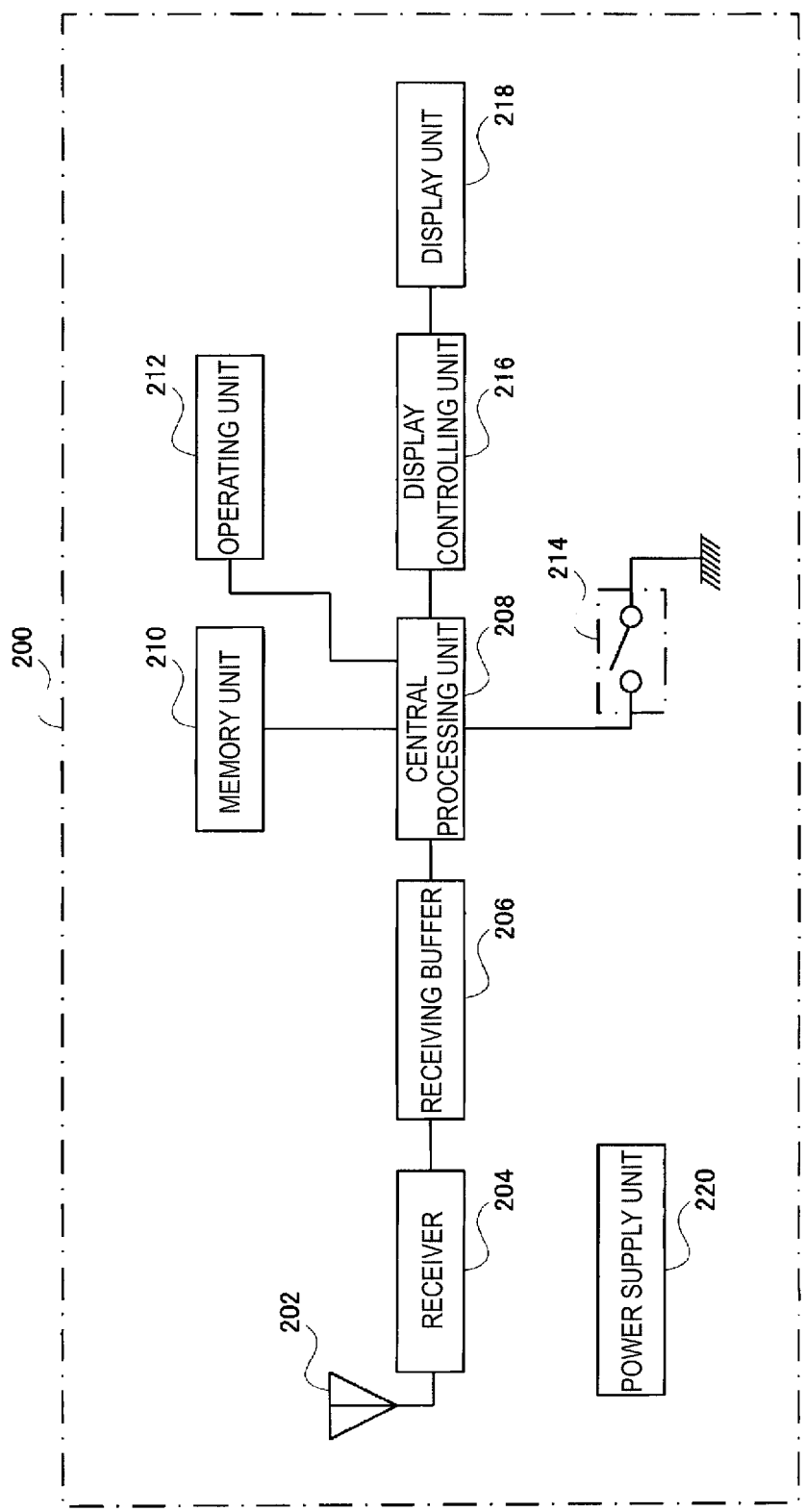
FIG. 6 is a circuit configuration diagram of the transmitting device illustrated in FIG. 1.

FIG. 6 is a circuit configuration of the monitoring device 200.

The monitoring device 200 is disposed, for example, at the location of the driver's seat in the vehicle 1 and reports air pressure information to the driver. The monitoring device 200 has an antenna 202, a receiver (receiving device) 204, a receiving buffer 206, a central processing unit 208, a memory unit 210, an operating unit 212, a switch 214, a display controlling unit 216, a display unit 218, and a power supply unit 220. A monitoring part that determines the presence or absence of a tire abnormality on the basis of the received tire information and then reports the determination result, is formed by the central processing unit 208, the memory unit 210, the operating unit 212, the switch 214, the display controlling unit 216, and the display unit 218.

The antenna 202 is aligned to the same frequency as the transmission frequency of the transmitting device 100 and is connected to the receiver 204.

The receiver 204 receives a transmission signal of a predetermined frequency transmitted from the transmitting device 100 and extracts pressure data and identification information data by demodulation processing. The data is outputted to the receiving buffer 206.

The receiving buffer 206 temporarily stores the pressure datum and the identifying information datum output from the receiver 204. The stored pressure datum and identifying information datum are output to the central processing unit 208 in accordance with a command from the central processing unit 208.

The central processing unit 208 is primarily constructed of a CPU and operates based on a program stored in the memory unit 210. The central processing unit 208 monitors the air pressure of the tires 2a to 2d for each instance of identifying information based on the received pressure datum and identifying information datum. Specifically, the central processing unit 208 determines the presence or absence of an abnormality of the tires 2a to 2d on the basis of the pressure data, and reports the determination results to the driver. "Determines the presence or absence of abnormalities of tire" means, for example, determining whether the tire has been punctured based on abnormally low air pressure or a sudden decline in air pressure over a short period of time.

The central processing unit 208 outputs the determination results to the display controlling unit 216 and the determination results are displayed on the display unit 218 via the display controlling unit 216.

Furthermore, the central processing unit 208 performs initial setting of the communication protocol or the like with the transmitting device 100 in accordance with the information from the operating unit 212 or the information from the switch 214. The setting of a determination condition for determining the presence or absence of a tire abnormality by the central processing unit 208 may be conducted based on information from the operating unit 212.

The memory unit 210 includes ROM in which the program that operates the CPU of the central processing unit 208 is stored and non-volatile memory such as, for example, EEPROM or the like. A table including the communication protocol with the transmitting device 100 is stored in the memory unit 210 at the manufacturing stage. The transmitting device 100 and the monitoring device 200 communicate with a communication protocol set in advance in the initial stage. The communication protocol table contains information such as communication protocols, transfer bit rates, data formats, and the like, associated with the unique identification information of each transmitting device 100. The information may be freely changed with an input from the operating unit 212.

The operating unit 212 includes an input device such as a keyboard, and is used for inputting various types of information and conditions. The switch 214 is used for instructing the central processing unit 208 to start initialization.

The display controlling unit 216 controls the display unit 218 to display tire air pressure associated with the mounting position of the tires 2a to 2d in accordance with the determination result from the central processing unit 208. The display controlling unit 216 controls the display unit 218 to display the determination result that indicates the tire puncture condition at the same time.

The power supply unit 220 supplies electrical power through a power source line, not illustrated, by controlling the electrical power supplied from a battery mounted in the vehicle 1 at a voltage suitable for each unit of the monitoring device 200.

(Detailed Description of Casing, Through Hole, and Sensor Unit)

Detailed description will be given below of the casing 102, the through hole 122, and the sensor detection face 111 of the sensor unit 110.

As illustrated in FIG. 4, the through hole 122 provided in the casing 102 passes through the wall of the casing 102 and extends in an orthogonal direction to the sensor detection face 111 of the sensor. The sensor detection face 111 in the sensor of the sensor unit 110 adjoins directly the inner side aperture part 122b without interposing a space therebetween. That is, the outer side surface of the sensor unit 110 surrounding the sensor detection face 111 is in contact with the side wall face of the inner section of the casing 102 and the sensor detection face 111 adjoins the space in the through hole 122. Since it is possible to suppress the thickness of the casing 102 and the thickness of the transmitting device 100 according to this configuration, it is possible to prevent difficulties in the rim assembly due to a tire assembly lever interfering with the casing 102 when the tire is assembled on the rim. In addition, since the tire assembly lever no longer hits the casing 102, it is possible to suppress damage to the casing 102 and to the transmitting device 100.

However, by configuring the sensor detection face 111 so as to adjoin directly the inner side aperture part 122b without interposing a space between the space of the through hole 122 and the sensor detection face 111, it is necessary to prevent the puncture repairing liquid entering the through hole 122 attaching to the sensor detection face 111. For this reason, by making it easy for the puncture repairing liquid entering into the inner section of the through hole 122 to attach to the side wall face of the through hole 122, it is possible to make it difficult for the puncture repairing liquid to attach to the sensor detection face 111. However, when the puncture repairing liquid entering into the inner section of the through hole 122 is attached to the side wall faces in a large amount, the through hole 122 itself is blocked and there are cases where it is not possible for the sensor unit 110 to accurately detect the tire information. In the present embodiment, when the distance between the outer side aperture part 122a and the inner side aperture part 122b in the direction orthogonal to the sensor detection face 111 is set to h mm, the volume of the through hole 122 interposed between the outer side aperture part 122a and the inner side aperture part 122b is set to V mm$^3$, and the surface area of the side wall face of the through hole 122 excluding the outer side aperture part 122a and the inner side aperture part 122b is set to A mm$^2$, the through hole 122 is configured such that the distance h mm is 3 to 15 mm, and the ratio A/V of the surface area A mm$^2$ with respect to the volume V mm$^3$ is 3.0 to 30.0 mm$^{-1}$. In the through hole 122 having such dimensions, in a case in which the ratio A/V is smaller than the range described above, since the surface area A is small with respect to the volume V, it is easy for the cross-section of the through hole 122 to be blocked when the puncture repairing liquid entering inside the through hole 122 attaches to the surface of the side wall face of the through hole 122. On the other hand, in a case in which the ratio A/V is greater than the range described above, the puncture repairing liquid entering inside the through hole 122 is easily attached to the side wall faces since the surface area A is large with respect to the volume V. Since, even when attached, the puncture repairing liquid spreads and attaches on the surface of the side wall face, it is difficult for the cross-section of the through hole 122 to be blocked. However, the processing of the through hole 122 where the ratio A/V is greater than the range described above is extremely difficult and manufacturing is difficult in practice. By the ratio A/V being 3.0 to 30.0 mm$^{-1}$, it is possible to manufacture the through hole 122 in a practical manner as understood from the Experiment Examples to be described below, and it is difficult for the puncture repairing liquid to block the through hole 122. In a case in which the distance h is less than 3 mm, it is difficult for the puncture repairing liquid to attach to the side wall face of the through hole 122 since the distance h is short, and it is easy for the puncture repairing liquid to drip onto the sensor detection face 111. The practical upper limit of the distance h is 15 mm. Since the thickness of the casing 102 itself increases when this upper limit is exceeded, the rim assembly is difficult when the tire is assembled on the rim due to a tire assembly lever interfering with the casing 102 and there is an increased possibility of damage to the casing 102 and the transmitting device 100. In addition, the ratio of the circumferential length of the inner side aperture part 122*b* with respect to the circumferential length of the outer side aperture part 122*a* is preferably 3 or greater, and it is preferable that the upper limit of the ratio be 30.

In addition, the area of the outer side aperture part 122*a* is 0.8 mm² or less. By setting the area of the outer side aperture part 122*a* to 0.8 mm² or less, the possibility of the puncture repairing liquid blocking the through hole 122 is extremely small since it is difficult for the puncture repairing liquid to enter inside the through hole 122 from the outer side aperture part 122*a*.

In addition, it is preferable that the area of the outer side aperture part 122*a* be smaller than the area of the inner side aperture part 122*b* in terms of reducing the possibility of the puncture repairing liquid entering the inner section of the through hole 122 even if the ratio A/V is the same. In addition, it is preferable that the circumferential length of the inner side aperture part 122*a* be, for example, 3 to 30 times the circumferential length of the outer side aperture part 122*b*.

Figure 7A:
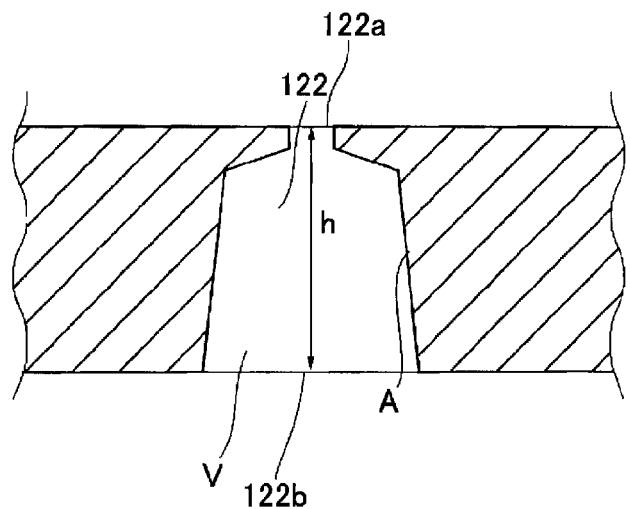
FIGS. 7A and 7B are diagrams illustrating other examples of shapes of a through hole.

FIG. 7A is a diagram illustrating an example of a shape of the through hole 122 where the distance h mm is 3 mm or greater and the ratio A/V is 3.0 to 30.0 mm$^{-1}$. The area of the outer side aperture part 122*a* is small; however, the inner section of the through hole 122 preferably has a shape where the cross-section rapidly expands and then gradually becomes larger toward the inner side aperture part 122*b*. By using such a shape, it is possible for the ratio A/V to be 3.0 mm$^{-1}$ or greater and the puncture repairing liquid entering inside the through hole 122 is easily attached to the side wall faces of the through hole 122. Since, even when attached, the puncture repairing liquid spreads and attaches on the surface of the side wall face, it is difficult for the cross-section of the through hole 122 to be blocked.

Furthermore, it is possible for the hole shape of the through hole 122 illustrated in FIG. 7A to be determined as follows. That is, the hole shape described above is a shape in which an expansion ratio, which represents an increase per unit length in a hole depth direction from the outer side aperture part 122*a* to the inner side aperture part 122*b*, of an area of a cross-section of the through hole 122 when the through hole 122 is cut at a surface parallel to the sensor detection face 111, has a maximum midway from the outer side aperture part 122*a* to the inner side aperture part 122*b*. In this manner, the hole shape where the expansion ratio has the maximum midway from the outer side aperture part 122*a* to the inner side aperture part 122*b* is preferable in terms of it being possible to increase the area of the side walls of the through hole 122 and being possible to easily set the ratio A/V to 3.0 to 30.0 mm$^{-1}$.

Figure 7B:
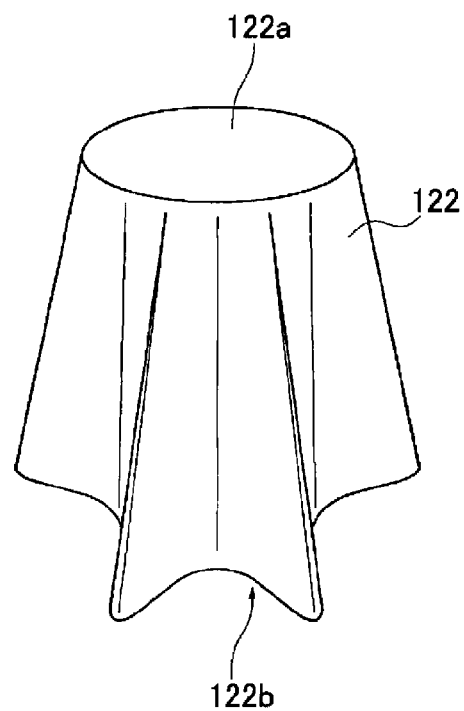

Furthermore, it is similarly preferable that the shape of the through hole 122 be the shape as illustrated in FIG. 7B in order to be the through hole 122 where the distance h mm is 3 mm or greater and the ratio A/V is 3.0 to 30.0 mm$^{-1}$. That is, FIG. 7B is a diagram representing the shape of the through hole 122. It is preferable that the side wall face of the through hole 122 forms a folded shape undulating with ridges and grooves. For this reason, the surface area A mm² of the side wall faces is relatively large with respect to the volume V mm³ and it is possible to set the ratio A/V to 3.0 to 30.0 mm$^{-1}$. Even in such a case, since the ratio A/V is high, the puncture repairing liquid entering inside the through hole 122 is easily attached to the side wall face. Since, even when attached, the puncture repairing liquid spreads and attaches on the surface of the side wall face, it is difficult for the cross-section of the through hole 122 to be blocked. Furthermore, it is preferable that the fold depth of the folded shape in this case be increased from the outer side aperture part 122*a* toward the inner side aperture part 122*b* in terms of setting the ratio A/V to 3.0 to 30.0 mm$^{-1}$. Furthermore, it is preferable that the cross-sectional area of the through hole 122 when the through hole 122 is cut at a surface parallel to the sensor detection face 111 be continuously increased from the outer side aperture part 122*a* toward the inner side aperture part 122*b* in terms of easily setting the ratio A/V to 3.0 to 30.0 mm$^{-1}$.

In addition, as illustrated in FIG. 7B, it is preferable that valley sections and peak sections of the folded shape of the side wall faces of the through hole 122 extend from the outer side aperture part 122*a* toward the inner side aperture part 122*b* while maintaining the same position on the circumference seen from the center of the through hole 122.

Figure 8A:
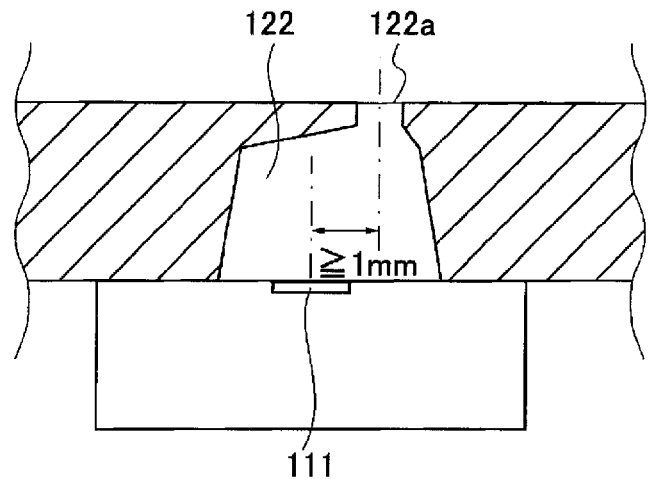
FIGS. 8A and 8B are diagrams illustrating other examples of shapes of the through hole.

In the present embodiment, as described above, since the sensor detection face 111 adjoins directly the inner side aperture part 122*b* without interposing a space therebetween, there is a possibility that the puncture repairing liquid will drip onto the sensor detection face 111 in a case in which the puncture repairing liquid entering the inner section of the through hole 122 is not attached to the side wall face. For this reason, when the outer side aperture part 122*a* of the through hole 122 projects onto a plane including the sensor detection face 111 in a direction orthogonal to the sensor detection face 111, it is preferable that the outer side aperture part 122*a* of the through hole 122 be arranged in a manner that a distance between a central position (center of gravity position) of the sensor detection face 111 and a center projection position (center of gravity position) of the outer side aperture part 122*a* is 1 mm or greater. The distance between a central position of the sensor detection face 111 and the center projection position of the outer side aperture part 122*a* is more preferably 2 mm or greater, and even more preferably 4 mm or greater. FIG. 8A is a diagram illustrating an example of a form of the through hole 122.

Figure 8B:
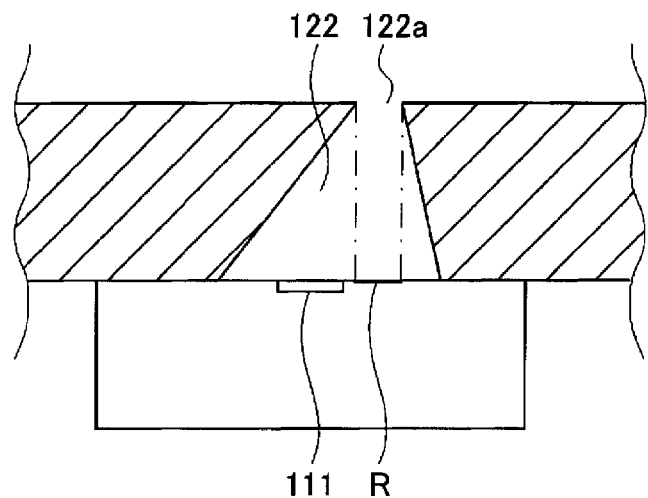

FIG. 8B is a diagram illustrating a further example of a different form of the through hole 122. As illustrated in FIG. 8B, it is preferable that all portions of a projection position R of the region of the outer side aperture part 122*a* be positioned away from the sensor detection face 111. For this reason, it is possible to suppress erroneous operations of the sensor detection face 111 since the puncture repairing liquid entering in the inner section of the through hole 122 is attached to the surface of the sensor unit 110 away from the sensor detection face 111 even in a case in which the puncture repairing liquid is not attached to the side wall faces.

As described above, the area of the outer side aperture part 122*a* in the present embodiment is 0.8 mm² or less, the sensor detection face 111 adjoins directly the inner side aperture part 122*b* of the through hole 122 without interposing a space therebetween, the distance h mm is 3 mm or greater but 15 mm or less, and the ratio A/V of the surface area A mm² with respect to the volume V mm³ is 3.0 to 30.0 mm$^{-1}$.

Since the sensor detection face 111 adjoins directly the inner side aperture part 122*b* of the through hole 122 without interposing a space therebetween, it is possible to reduce the thickness of the casing 102 and it is possible to prevent difficulties in the rim assembly due to a tire assembly lever interfering with the casing 102 when the tire is assembled on the rim. In addition, since the tire assembly lever no longer hits the casing 102, it is possible to suppress damage to the casing 102 and to the transmitting device 100. Furthermore, since the ratio A/V is 3.0 to 30.0 mm$^{-1}$, the puncture repairing liquid entering the inner section of the through hole 122 easily attaches to the side wall faces. Thus, it is possible to suppress blocking of the cross-section of the through hole 122 since the puncture repairing liquid does not easily reach the sensor detection face 111 and the puncture repairing liquid is attached by spreading on the surface of the side wall face even when attached.

(Experiment Examples)

In order to investigate the effects of the present embodiment, using the tire state monitoring system 10 having the transmitting device 100 in the form illustrated in FIG. 3, transmitting devices of Working Examples 1 to 6 and Comparative Examples 1 to 4 in which the shapes of the through holes 122 were changed in various ways were produced and it was judged whether or not the puncture repairing liquid easily blocked the ventilation holes.

After fixing the transmitting devices 100 having the through holes with the shapes of each of the working examples and comparative examples to rims with a rim size of 15×6J, 195/65R15 tires were assembled on the rims. At that time, 450 mL of the puncture repairing liquid was introduced into the tire hollow region. The air pressure in the tires was set to 200 KPa. After this, the tires were assembled on a passenger vehicle with a 2.0 liter displacement and the vehicle traveled for 2 hours at a traveling speed of 30 to 80 km/hour on a paved road of a test course. After this, the air was gradually let out from inside the tire hollow region and the measuring results of the tire state monitoring system 10 were investigated. With the measured air pressure, it was possible to confirm that the measuring values of the air pressure were gradually reduced by letting out the air, and whether or not abnormalities in the measurement could be seen was investigated. Furthermore, the casing 102 of the transmitting device 100 was disassembled such that it was possible to see the inner wall face of the through hole 122 and the sensor detection face 111, and the extent of the attachment of the puncture repairing liquid to the inner wall face of the through hole 122 and the sensor detection face 111 was investigated.

The evaluation relating to the blocking of the through hole 122 was judged using four stages of the following levels 1 to 4. Levels 3 and 4 were levels counted as a pass.

Level 1: Accurate measurement of the air pressure was not possible as the through hole 122 was clogged with the puncture repairing liquid.

Level 2: The through hole 122 was substantially clogged with the puncture repairing liquid and accurate measurement of the air pressure took time.

Level 3: The through hole 122 was not clogged with the puncture repairing liquid; however, attachment of the puncture repairing liquid to the sensor detection face 111 was seen. However, accurate air pressure measurement was possible.

Level 4: The through hole 122 was not clogged with the puncture repairing liquid and there was no attachment of the puncture repairing liquid to the sensor detection face 111 either. Accurate air pressure measurement was possible.

Furthermore, the ease of the rim assembly (rim assembling property) of the rims having the transmitting devices 100 was evaluated. The evaluation was judged using 3 stages of the following levels 1 to 3.

Level 1: The casing 102 of the transmitting device 100 physically interfered with the tire to be assembled and the transmitting device 100 was damaged.

Level 2: The casing 102 of the transmitting device 100 slightly physically interfered with the tire to be assembled; however, rim assembly was possible.

Level 3: The casing 102 of the transmitting device 100 did not interfere with the tire to be assembled and rim assembly was possible without any problems.

The following Tables 1 and 2 show the specifications of the Working Examples 1 to 7 and the Comparative Examples 1 to 4 and the evaluation results thereof.

In Working Examples 1 to 7 and Comparative Examples 1 to 4, the cross-section of the outer side aperture part 122a was fixed as a circular shape of 0.8 mm$^2$, the size and shape of the cross-section of the inner side aperture part 122b were changed, the shape of the side wall faces of the through hole 122 was set to a folded shape as illustrated in FIG. 7B, and the ratio A/V was changed by adjusting the depth and size of the folds. In addition, the distance h mm was changed by altering the thickness of the walls of the casing 102. Here, for Comparative Example 4, the fold depth of the folded shape of the side wall faces of the through hole 122 was designed to be deep such that A/V became 32.5 mm$^{-1}$; however, production (injection forming and subsequent hole processing) was not possible.

TABLE 1

|  | Working Example 1 | Working Example 2 | Working Example 3 | Working Example 4 |
|---|---|---|---|---|
| Distance h (mm) | 3.0 | 4.0 | 15.0 | 3.0 |
| Ratio A/V (mm$^{-1}$) | 3.0 | 3.5 | 4.2 | 18.0 |
| Distance between central position of sensor detection face and center projection position of outer side aperture part (mm) | 0.0 | 0.0 | 0.0 | 0.0 |
| Projection position R of region of outer side aperture part | In sensor detection face | In sensor detection face | In sensor detection face | In sensor detection face |
| Ease of rim assembly | 3 | 3 | 2 | 3 |
| Presence or absence of blockage in through hole | 3 | 3 | 4 | 4 |

|  | Working Example 5 | Working Example 6 | Working Example 7 |
|---|---|---|---|
| Distance h (mm) | 3.0 | 3.0 | 3.0 |
| Ratio A/V (mm$^{-1}$) | 30.0 | 3.5 | 5.0 |

TABLE 1-continued

| | | | |
|---|---|---|---|
| Distance between central position of sensor detection face and center projection position of outer side aperture part (mm) | 0.0 | 1.0 | 3.0 |
| Projection position R of region of outer side aperture part | In sensor detection face | In sensor detection face | Out of sensor detection face |
| Ease of rim assembly | 3 | 3 | 3 |
| Presence or absence of blockage in through hole | 4 | 4 | 4 |

TABLE 2

| | Comparative Example 1 | Comparative Example 2 | Comparative Example 3 | Comparative Example 4 |
|---|---|---|---|---|
| Distance h (mm) | 2.0 | 16.0 | 4.0 | 4.0 |
| Ratio A/V (mm$^{-1}$) | 2.6 | 4.2 | 2.7 | 32.5 |
| Distance between central position of sensor detection face and center projection position of outer side aperture part (mm) | 0.0 | 0.0 | 0.0 | 0.0 |
| Projection position R of region of outer side aperture part | In sensor detection face | In sensor detection face | In sensor detection face | In sensor detection face |
| Ease of rim assembly | 3 | 1 | 2 | — |
| Presence or absence of blockage in through hole | 1 | 4 | 2 | — |

According to a comparison of the evaluation results of Working Examples 1 to 5 and Comparative Examples 1 to 4, it was understood that setting the distance h mm to 3 to 15 mm and setting the ratio A/V to 3.0 to 30.0 mm$^{-1}$ was effective in terms of the rim assembly property and of suppressing the blocking of the through hole 122. In addition, as in Working Examples 6 and 7, it was understood that the attachment of the puncture repairing liquid on the sensor detection face 111 was reduced by adjusting the positional relationship between the sensor detection face 111 and the outer side aperture part 122a and thus this is preferable.

In addition, in a case in which the area of the outer side aperture part 122a was changed from 0.8 mm$^2$ to 0.9 mm$^2$ in the specifications of Working Example 1, the evaluation of the presence or absence of the blocking of the through hole was level 1.

Above, detailed description was given of the transmitting device and the tire state monitoring system of the present technology; however, the transmitting device and the tire state monitoring system of the present technology are not limited to the embodiments described above and may include various improvements and modifications within a range which does not depart from the gist of the present technology.

The invention claimed is:

1. A transmitting device disposed in a tire hollow region, configured to transmit tire information relating to a state of the tire, the transmitting device comprising:
   a sensor configured to detect, as tire information, a state of a gas which is filled in a hollow region of a tire which is surrounded by the tire and a rim;
   a transmitter configured to wirelessly transmit the detected tire information; and
   a casing which houses the sensor and the transmitter therewithin;
   the casing being provided with a through hole which passes through a wall of the casing and which extends in an orthogonal direction to a sensor detection face of the sensor,
   an area of an outer side aperture part positioned on a tire hollow region side of the through hole being 0.8 mm$^2$ or less,
   an inner side aperture part of the through hole positioned on a side of the sensor detection face adjoining the sensor detection face without interposing a space therebetween,
   a ratio A/V of a surface area A mm$^2$ of side walls surrounding the through hole with respect to a volume V mm$^3$ of the through hole interposed between the outer side aperture part and the inner side aperture part being 3.0 to 30.0 mm$^{-1}$, and
   a distance h mm between the outer side aperture part and the inner side aperture part in a direction orthogonal to the sensor detection face being 3 to 15 mm.

2. The transmitting device according to claim 1, wherein, upon the outer side aperture part of the through hole projecting onto a plane including the sensor detection face in a direction orthogonal to the sensor detection face, the outer side aperture part of the through hole is arranged in a manner that a distance between a central position of the sensor detection face and a center projection position of the outer side aperture part is 1 mm or greater.

3. The transmitting device according to claim 2, wherein a projection of the outer side aperture part onto the plane does not touch or overlap with the sensor detection face.

4. The transmitting device according to claim 3, wherein an area of the outer side aperture part is smaller than that of the inner side aperture part.

5. The transmitting device according to claim 4, wherein the through hole has a hole shape in which an expansion ratio, which represents an increase per unit length in a hole depth direction from the outer side aperture part to the inner side aperture part, of an area of a cross-section of the through hole when the through hole is cut at a surface parallel to the sensor detection face of the sensor, has a maximum midway from the outer side aperture part to the inner side aperture part.

6. The transmitting device according to claim 4, wherein a side wall face surrounding the through hole forms a folded shape undulating with ridges and grooves repeated along a circumference of the through hole.

7. The transmitting device according to claim 2, wherein an area of the outer side aperture part is smaller than that of the inner side aperture part.

8. The transmitting device according to claim 7, wherein the through hole has a hole shape in which an expansion ratio, which represents an increase per unit length in a hole depth direction from the outer side aperture part to the inner side aperture part, of an area of a cross-section of the through hole when the through hole is cut at a surface parallel to the sensor detection face of the sensor, has a maximum midway from the outer side aperture part to the inner side aperture part.

9. The transmitting device according to claim 7, wherein a side wall face surrounding the through hole forms a folded shape undulating with ridges and grooves repeated along a circumference of the through hole.

10. The transmitting device according to claim 9, wherein a depth of the ridges and grooves of the folded shape is increased from the outer side aperture part toward the inner side aperture part.

11. The transmitting device according to claim 10, wherein
the area of a cross-section of the through hole when the through hole is cut at a surface parallel to the sensor detection face of the sensor is continuously increased from the outer side aperture part toward the inner side aperture part.

12. The transmitting device according to claim 11, wherein
a circumference length of the inner side aperture part is 3 to 30 times a circumference length of the outer side aperture part.

13. The transmitting device according to claim 9, wherein
the area of a cross-section of the through hole when the through hole is cut at a surface parallel to the sensor detection face of the sensor is continuously increased from the outer side aperture part toward the inner side aperture part.

14. The transmitting device according to claim 1, wherein an area of the outer side aperture part is smaller than that of the inner side aperture part.

15. The transmitting device according to claim 14, wherein
the through hole has a hole shape in which an expansion ratio, which represents an increase per unit length in a hole depth direction from the outer side aperture part to the inner side aperture part, of an area of a cross-section of the through hole when the through hole is cut at a surface parallel to the sensor detection face of the sensor, has a maximum midway from the outer side aperture part to the inner side aperture part.

16. The transmitting device according to claim 14, wherein
a side wall face surrounding the through hole forms a folded shape undulating with ridges and grooves repeated along a circumference of the through hole.

17. The transmitting device according to claim 16, wherein
a depth of the ridges and grooves of the folded shape is increased from the outer side aperture part toward the inner side aperture part.

18. The transmitting device according to claim 16, wherein
the area of a cross-section of the through hole when the through hole is cut at a surface parallel to the sensor detection face of the sensor is continuously increased from the outer side aperture part toward the inner side aperture part.

19. The transmitting device according to claim 1, wherein
a circumference length of the inner side aperture part is 3 to 30 times a circumference length of the outer side aperture part.

20. A tire state monitoring system comprising:
a transmitting device;
a receiving device; and
a monitoring part;
the transmitting device having a sensor configured to detect, as tire information, a state of a gas which is filled in a hollow region of a tire which is surrounded by the tire and a rim,
a transmitter configured to wirelessly transmit the detected tire information, and
a casing which houses the sensor and the transmitter therewithin;
the receiving device configured to receive the tire information transmitted from the transmitter;
the monitoring part configured to determine presence or absence of abnormalities in the tire based on the tire information and reporting determination results;
the casing being provided with a through hole which passes through a wall of the casing and which extends in an orthogonal direction to a sensor detection face of the sensor,
an area of an outer side aperture part of a tire hollow region side of the through hole being 0.8 mm$^2$ or less,
an inner side aperture part of a sensor detection face side of the through hole adjoining the sensor detection face without interposing a space therebetween,
a ratio A/V of a surface area A mm$^2$ of side walls surrounding the through hole with respect to a volume V mm$^3$ of the through hole interposed between the outer side aperture part and the inner side aperture part being 3.0 to 30.0 mm$^{-1}$, and
a distance h mm between the outer side aperture part and the inner side aperture part in a direction orthogonal to the sensor detection face being 3 to 15 mm.

* * * * *